(12) United States Patent
Jiang

(10) Patent No.: US 8,886,927 B2
(45) Date of Patent: Nov. 11, 2014

(54) METHOD, APPARATUS AND SYSTEM FOR PREVENTING DDOS ATTACKS IN CLOUD SYSTEM

(71) Applicant: Huawei Technologies Co., Ltd., Guangdong (CN)

(72) Inventor: Wu Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/740,519

(22) Filed: Jan. 14, 2013

(65) Prior Publication Data

US 2013/0133068 A1     May 23, 2013

Related U.S. Application Data

(63) Continuation of application No. PCT/CN2011/081615, filed on Nov. 1, 2011.

(30) Foreign Application Priority Data

Dec. 7, 2010     (CN) .......................... 2010 1 0577221

(51) Int. Cl.
*H04L 29/06*     (2006.01)
*G06F 9/455*     (2006.01)
*H04L 29/08*     (2006.01)

(52) U.S. Cl.
CPC ........ *H04L 63/1458* (2013.01); *G06F 9/45533* (2013.01); *H04L 63/1425* (2013.01); *H04L 2463/142* (2013.01); *H04L 67/10* (2013.01); *G06F 9/45558* (2013.01); *G06F 2009/45587* (2013.01)
USPC .......................................... 713/151; 726/23

(58) Field of Classification Search
CPC ................................................ H04L 63/1458
USPC ............................................................ 713/151
See application file for complete search history.

(56) References Cited

U.S. PATENT DOCUMENTS

| 7,587,760 B1 | 9/2009 | Day |
| 2008/0163370 A1 | 7/2008 | Maynard |

(Continued)

FOREIGN PATENT DOCUMENTS

| CN | 101309150 A | 11/2008 |
| CN | 101383694 A | 3/2009 |

(Continued)

OTHER PUBLICATIONS

Extended European Search Report in corresponding European Patent Application No. 11846297.7 (Mar. 5, 2013).

(Continued)

*Primary Examiner* — Pramila Parthasarathy
(74) *Attorney, Agent, or Firm* — Leydig, Voit & Mayer, Ltd.

(57) ABSTRACT

A method, an apparatus and a system for preventing DDoS (Distributed Denial of Service) attacks in a cloud system. The method for preventing DDoS attacks in a cloud system includes: monitoring, by a protection node in a cloud system, data traffic input into virtual machines, where the cloud system includes the protection node and multiple virtual machines, and data streams communicated between the virtual machines pass through the protection node; extracting data streams to be input into virtual machines if it is detected that the data traffic input into the virtual machines is abnormal; sending the extracted data streams to a traffic cleaning apparatus for cleaning; receiving the data streams cleaned by the traffic cleaning apparatus; and inputting the cleaned data streams into the virtual machines. The technical solutions provided in the embodiments of the present disclosure can effectively prevent DDoS attacks between virtual machines in the cloud system.

4 Claims, 6 Drawing Sheets

(56) References Cited

U.S. PATENT DOCUMENTS

| | | | |
|---|---|---|---|
| 2009/0073895 A1 | 3/2009 | Morgan et al. | |
| 2009/0172799 A1 | 7/2009 | Morgan | |
| 2009/0254990 A1 | 10/2009 | McGee | |
| 2010/0100718 A1 | 4/2010 | Srinivasan | |
| 2010/0269171 A1 | 10/2010 | Raz et al. | |
| 2011/0023114 A1* | 1/2011 | Diab et al. | 726/22 |
| 2011/0035801 A1* | 2/2011 | Li | 726/22 |
| 2012/0005724 A1* | 1/2012 | Lee | 726/1 |

FOREIGN PATENT DOCUMENTS

| | | |
|---|---|---|
| CN | 101399835 A | 4/2009 |
| CN | 101465770 A | 6/2009 |
| CN | 101572609 A | 11/2009 |
| CN | 101588246 A | 11/2009 |
| CN | 102043917 A | 5/2011 |
| CN | 102043917 B | 10/2012 |
| EP | 2037657 A1 | 9/2008 |

OTHER PUBLICATIONS

1$^{st}$ Office Action in corresponding Chinese Patent Application No. 201010577221.7 (Feb. 23, 2012).

International Search Report in corresponding International Patent Application No. PCT/CN2011/081615 (Jan. 26, 2012).

* cited by examiner

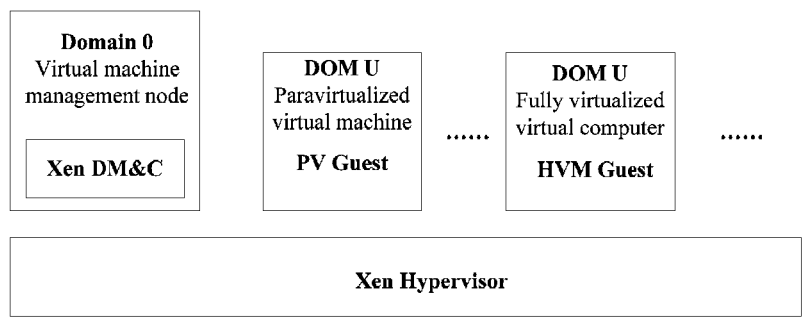
FIG. 1-a
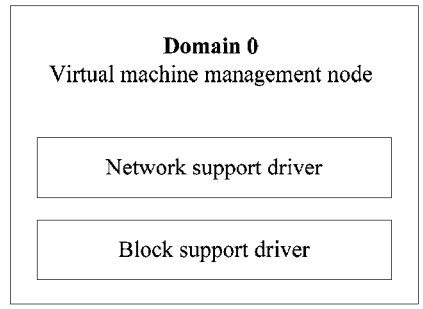
FIG. 1-b

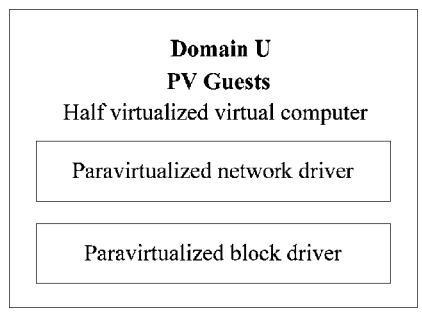
FIG. 1-c
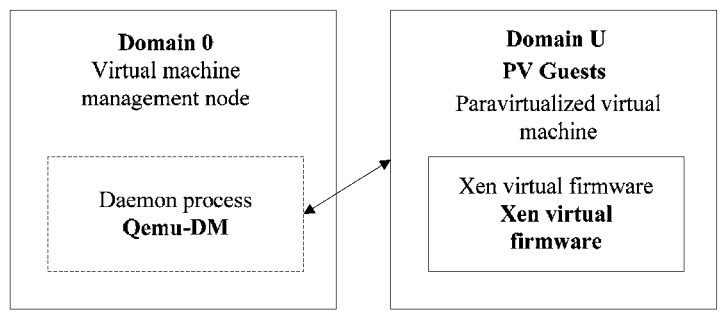
FIG. 1-d

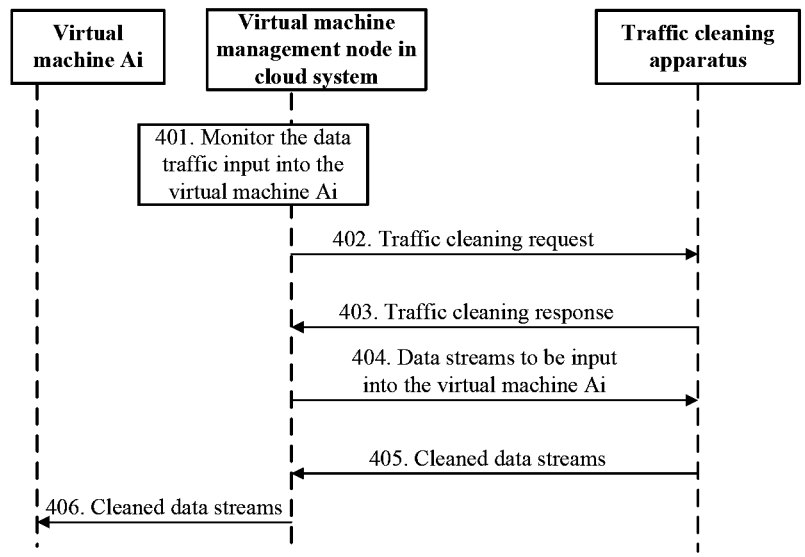
FIG. 4
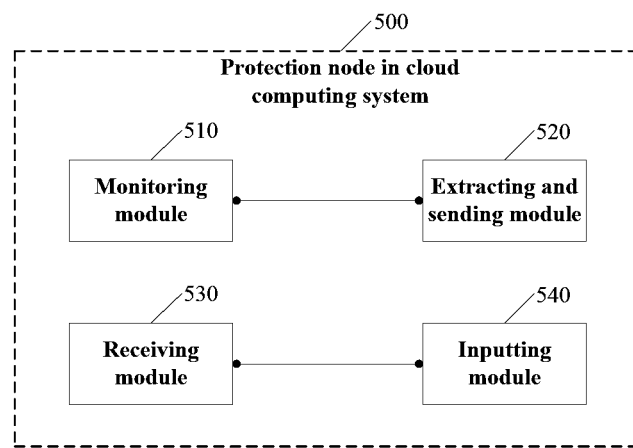
FIG. 5-a

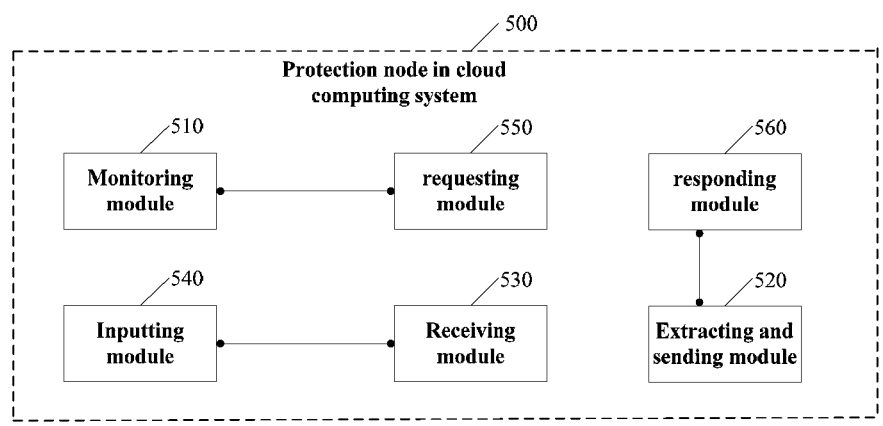
FIG. 5-b
FIG. 6

United States Patent US 8,886,927 B2

METHOD, APPARATUS AND SYSTEM FOR PREVENTING DDOS ATTACKS IN CLOUD SYSTEM

CROSS-REFERENCE TO RELATED APPLICATIONS

This application is a continuation of International Patent Application No. PCT/CN2011/081615, filed on Nov. 1, 2011, which claims priority to Chinese Patent Application No. 201010577221.7, filed on Dec. 7, 2010, both of which are hereby incorporated by reference in their entireties.

TECHNICAL FIELD

The present disclosure relates to the field of computer technologies, and in particular, to a method for preventing Distributed Denial of Service (DDoS) attacks in a cloud system, a protection node in a cloud system, and a protection system in a cloud system.

BACKGROUND

A Distributed Denial of Service (DDOS) attack primarily refers to an attack in which an attacker uses a control host as a stepping stone (for example, multiple levels and/or multiple layers) and controls a large number of infected, and thus controlled, hosts to form an attacking network to launch massive denial of service attacks on victim hosts.

The DDoS attacks may use the attacking network to launch the following attacks onto the victim hosts, for example, Internet Control Message Protocol (ICMP) flood attack, User Datagram Protocol (UDP) flood attack, and/or Synchronize (SYN) flood attack. The DDoS attack usually amplifies the attack of a single attacker exponentially, thus causing significant impact on a user host or even leading to a crash of the user host, and causing severe network congestion.

Currently, by using virtual machine software, one or more virtual machines may be simulated on one physical computer. The virtual machines work as physical computers. For example, operating systems and applications may be installed on the virtual machines, and the virtual machines may access network resources. The applications that run in a virtual machine work as applications in a physical computer.

A cloud computing system (a "cloud system" for short) may be considered as a cluster system that performs distributed computing, storage, and/or management on universal hardware. The cloud system provides high-throughput data access and is applicable to massive data computing and storage.

With the development of the cloud system technology, a cloud system may include tens of thousands of virtual machines, and therefore security protection of the virtual machines in the cloud system is attracting more and more attention. It is especially important to prevent the DDoS attacks between the virtual machines in the cloud system. However, an existing DDoS prevention mechanism is primarily prevention against the DDoS attacks between different cloud systems, between a cloud system and the hosts outside the cloud system, and between the hosts between non-cloud systems, but is not applicable to preventing the DDoS attacks between virtual machines in a cloud system.

SUMMARY

Embodiments of the present disclosure provide a method, an apparatus and a system for preventing DDoS attacks in a cloud system to prevent DDoS attacks between virtual machines in a cloud system effectively.

To solve the above technical problem, the embodiments of the present disclosure provide the following technical solutions:

One embodiment of the disclosure provides a method for preventing DDoS attacks in a cloud system that includes:

monitoring, by a protection node in a cloud system, data traffic input into virtual machines, where the cloud system includes the protection node and multiple virtual machines, and where data streams communicated between the virtual machines pass through the protection node;

detecting that the data traffic input into the virtual machines is abnormal;

in response to the detecting, extracting data streams to be input into the virtual machines;

sending the extracted data streams to a traffic cleaning module for cleaning;

receiving cleaned data streams that are cleaned by the traffic cleaning module; and inputting the cleaned data streams into the virtual machines.

Another embodiment of the disclosure provides a protection node in a cloud system is provided in an embodiment of the present disclosure, where the cloud system includes the protection node and one or more virtual machines, where data streams communicated between the virtual machines pass through the protection node, the protection node including:

a monitoring module, configured to monitor data traffic input into the virtual machines;

an extracting and sending module, configured to extract data streams to be input into the virtual machines when the monitoring module detects that the data traffic input into the virtual machines is abnormal, and configured to send the extracted data streams to a traffic cleaning module for cleaning;

a receiving module, configured to receive cleaned data streams cleaned by the traffic cleaning module; and an inputting module, configured to input the cleaned data streams that are received by the receiving module into the virtual machines.

Yet another embodiment of the disclosure provides a protection system in a cloud system is provided in an embodiment of the present disclosure, where the cloud system includes a protection node and one or more virtual machines, and where data streams communicated between the virtual machines pass through the protection node, the protection system including:

the protection node, configured to monitor data traffic input into the virtual machines; extract data streams to be input into the virtual machines when the protection node detects that the data traffic input into the virtual machines is abnormal, and send the extracted data streams to a traffic cleaning module for cleaning; receive cleaned data streams cleaned by the traffic cleaning module; and input the cleaned data streams into the virtual machines; and a traffic cleaning module, configured to clean the data streams that are received from the protection node in the cloud system, and send the cleaned data streams to the protection node in the cloud system.

Therefore, in the embodiments of the present disclosure, a protection node is deployed in the cloud system. The protection node in the cloud system monitors the data traffic input into the virtual machines; extracts the data streams to be input into the virtual machines if it is detected that the data traffic input into the virtual machines is as abnormal, and sends the extracted data streams to the traffic cleaning apparatus for cleaning; and inputs the data streams cleaned by the traffic cleaning apparatus back to the virtual machines. Because DDOS protection is performed by using the protection node in the cloud system, not only the DDOS attacks launched by external networks onto the virtual machines in the cloud system are prevented, but also the DDOS attacks between the virtual machines in the cloud system are prevented effectively, and the security and the reliability of the cloud system are enhanced comprehensively.

BRIEF DESCRIPTION OF THE DRAWINGS

To illustrate the technical solutions in the embodiments of the present disclosure more clearly, the following briefly describes the accompanying drawings needed for describing the embodiments. The accompanying drawings in the following description merely show some embodiments of the present disclosure, and persons skilled in the art may derive other drawings from these drawings without creative efforts.

FIG. 1-a is a schematic diagram of a Xen virtual environment according to an embodiment of the present disclosure;

FIG. 1-b is a schematic structural diagram of a Domain 0 driver according to an embodiment of the present disclosure;

FIG. 1-c is a schematic structural diagram of a Domain U driver according to an embodiment of the present disclosure;

FIG. 1-d is a schematic diagram of a Domain 0 process that safeguards Domain U according to an embodiment of the present disclosure;

FIG. 4 is a flowchart of a method for preventing DDoS attacks in a cloud system according to Embodiment 2 of the present disclosure;

FIG. 5-a is a schematic diagram of a protection node in a cloud system according to Embodiment 3 of the present disclosure;

FIG. 5-b is a schematic diagram of another protection node in a cloud system according to Embodiment 3 of the present disclosure; and FIG. 6 is a schematic diagram of a protection system in a cloud system according to Embodiment 4 of the present disclosure.

DETAILED DESCRIPTION OF THE EMBODIMENTS

Figure 2:
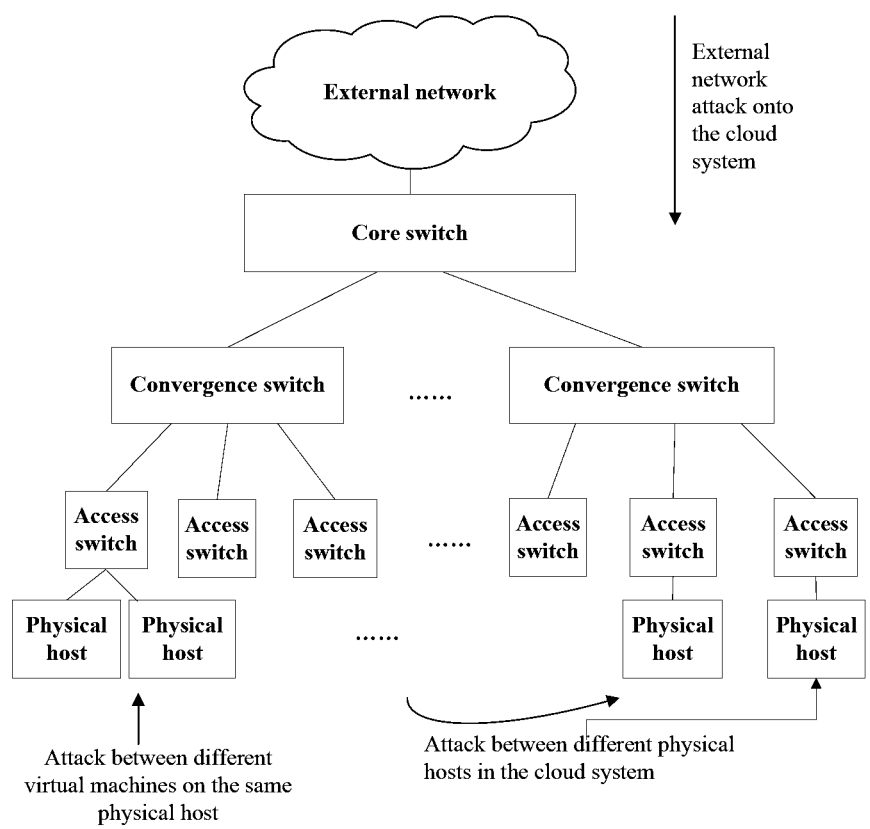
FIG. 2 is a schematic diagram of DDoS attacks according to an embodiment of the present disclosure.

To make the solutions of the present disclosure more comprehensible for persons skilled in the art, the following clearly describes the technical solutions according to the embodiments of the present disclosure with reference to the accompanying drawings. The embodiments in the following description are merely a part rather than all of the embodiments of the present disclosure. All other embodiments obtained by persons skilled in the art based on the embodiments of the present disclosure without creative efforts shall fall within the protection scope of the present disclosure.

For ease of understanding, the following briefly describes a virtual system operation manner first.

As shown in FIG. 1-a, a Xen virtual environment may include the following mutually collaborative elements:

Hypervisor (for example, a Xen Hypervisor)
Domain 0
Domain U PV client system
Domain U HVM client system The Xen Hypervisor is a software layer between hardware and an operating system, and is primarily responsible for central processing unit (CPU) scheduling and memory partitioning between virtual machines. The Xen Hypervisor not only abstracts a hardware layer, but also controls the running of the virtual machines because the virtual machines share the same processing environment. The Xen Hypervisor generally does not handle network requests, storage device requests, video requests, or other Input/Output (I/O) requests. The Xen Hypervisor is merely one example of a hypervisor according to embodiments of the disclosure.

Domain 0 is generally a modified Linux kernel (or another kernel). Domain 0 may be considered as a management node of other virtual machines. Domain 0 is generally a virtual machine that uniquely runs on the Xen Hypervisor, and generally has the right of accessing physical I/O resources, and interacts with other virtual machines that run on a virtual system. Domain 0 needs to be started before other Domains are started. Domain 0 generally includes two drivers (as shown in FIG. 1-b): Network Backend Driver and Block Backend Driver, which are responsible for handling network requests from Domain U and local disk requests respectively. The Network Backend Driver may directly communicate with the local network hardware to handle all network requests from a client operating system on Domain U. The Block Backend Driver may communicate with a local storage device to handle read/write requests from Domain U.

Domain U is a virtual machine that runs on Xen Hypervisor. Fully virtualized virtual machines are called "Domain U HVM Guests," on which an operating system with an unmodified kernel (such as, for example, Microsoft® Windows®) runs; paravirtualized (PV) virtual machines are called "Domain U PV Guests," on which an operating system with a modified kernel runs (such as, for example, Linux, Solaris, FreeBSD, or other operating systems).

Domain U PV Guests may also include two drivers (as shown in FIG. 1-c): a paravirtualized network driver (PV Network Driver), and a paravirtualized block driver (PV Block Driver).

No paravirtualized driver (PV Driver) exists in Domain U HVM Guests virtual machines, but a special daemon process called Qemu-dm is started, in Domain 0, for each fully virtualized client (HVM Guest), and the Qemu-dm is responsible for the handling network requests and disk requests of the client operating system.

As shown in FIG. 1-d, Domain U HVM Guests may be initialized into a type of machine, and Xen virtual firmware may be added onto Domain U to simulate the BIOS.

As shown in FIG. 2, a network attack on a cloud system mainly includes three types:

an external network attack on a cloud system, which is mainly: an attack launched by an external network;

an attack between different physical hosts in a cloud system, which is mainly: an attack launched between different physical hosts in a cloud system; and an attack between different virtual machines in the same physical host in a cloud system, which is mainly: an attack launched between different virtual hosts in the same physical host in a cloud system.

The embodiments of the present disclosure deal with protection against Distributed Denial of Service (DDoS) attacks launched between different virtual machines on the same physical host or different physical hosts in a cloud system.

The following gives more details about the embodiments of the present disclosure.

Embodiment 1

This embodiment provides a method for preventing Distributed Denial of Service (DDoS) attacks in a cloud system.

The method may include: monitoring, by a protection node in a cloud system, data traffic input into virtual machines; extracting data streams to be input into the virtual machines if it is detected that the data traffic input into the virtual machines is abnormal, and sending the extracted data streams to a traffic cleaning apparatus for cleaning; receiving the data streams cleaned by the traffic cleaning apparatus; and inputting the cleaned data streams into the virtual machines.

Figure 3:
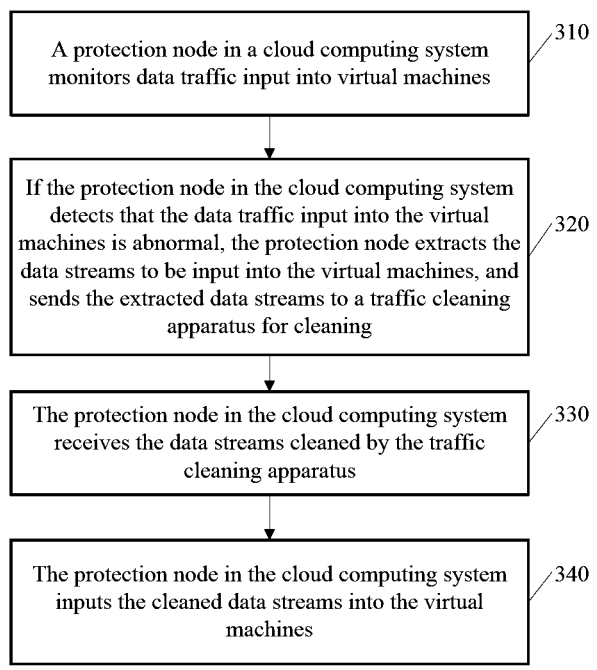
FIG. 3 is a flowchart of a method for preventing DDoS attacks in a cloud system according to Embodiment 1 of the present disclosure.

As shown in FIG. 3, the method may include the following detailed steps:

Step 310: The protection node in the cloud system monitors data traffic input into the virtual machines.

The cloud system includes the protection node and multiple virtual machines, and data streams communicated between the virtual machines pass through the protection node.

In an application scenario, the protection node in the cloud system may be a virtual machine management node in the cloud system (the virtual machine management node in the cloud system manages one or more virtual machines located in the same physical host or different physical hosts in the cloud system), or may be an apparatus deployed between the virtual machine management node and each virtual machine in the cloud system. The data streams communicated between the external network and each virtual machine in the cloud system, and the data streams communicated between the virtual machines in the cloud system, pass through the protection node in the cloud system. The protection node in the cloud system monitors the data streams input into the virtual machines. The data streams input into a virtual machine may come from the external network, or come from other virtual machines in the cloud system. The protection function and the monitoring function may be implemented by security protection software on the virtual machine management node.

In practical application, the protection node in the cloud system may collect statistics on the data traffic input into the virtual machines within a preset duration (such as 30 seconds, 1 minute, or another value), for example. If the statistics show that the data traffic input into a virtual machine within a preset duration exceeds a preset threshold (such as 50 MB (megabytes), 100 MB, or another value), it may be determined that the data traffic input into the virtual machine is abnormal.

Step 320: If the protection node in the cloud system detects that the data traffic input into the virtual machines is abnormal, then the protection node extracts the data streams to be input into the virtual machines, and sends the extracted data streams to a traffic cleaning apparatus for cleaning.

In an application scenario, when the protection node in the cloud system detects that the data traffic input into the virtual machines is abnormal, the protection node in the cloud system may extract the data streams to be input into the virtual machines directly, and send the extracted data streams to the traffic cleaning apparatus for cleaning directly. Alternatively, after the protection node in the cloud system detects that the data traffic input into the virtual machines is abnormal, the protection node may first send, to the traffic cleaning apparatus, a traffic cleaning request indicating a request for cleaning traffic; if a traffic cleaning response indicating permission of traffic cleaning is received from the traffic cleaning apparatus (indicating that the traffic cleaning apparatus has sufficient cleaning resources, where the cleaning resources may refer to idle processing capabilities), then the protection node extracts the data streams to be input into the virtual machines, and sends the extracted data streams to the traffic cleaning apparatus for cleaning. In addition, if a traffic cleaning response, which indicates no permission of traffic cleaning, is received from the traffic cleaning apparatus (indicating that the traffic cleaning apparatus may lack sufficient cleaning resources currently), the protection node in the cloud system may wait for a certain period (such as 2 seconds, 5 seconds, or another value), and then send, to the traffic cleaning apparatus, a traffic cleaning request indicating a request for cleaning the traffic. This process repeats itself until the traffic cleaning apparatus finishes cleaning the traffic. Particularly, if multiple traffic cleaning apparatuses are available for selecting, then if the traffic cleaning apparatus currently requested to clean the traffic lacks sufficient cleaning resources for the moment, the protection node in the cloud system may request another traffic cleaning apparatus to clean the traffic.

In practical application, abnormal data traffic may be caused by UDP flood, SYN flood, ICMP Flood, or another DDoS attack. The initiator of the DDOS attack may be an external network or another virtual machine in the cloud system.

The traffic cleaning apparatus may be an independently-deployed traffic cleaning board, or another deployed structure. The traffic cleaning apparatus may clean traffic by using one or more of the following technologies: SYN bounce, TCP proxy, UDP flow limiting, null connection detection, DNS TC bounce and other technologies.

Step 330: The protection node in the cloud system receives the data streams cleaned by the traffic cleaning apparatus.

Step 340: The protection node in the cloud system inputs the cleaned data streams into the virtual machines.

Understandably, the protection node in the cloud system inputs the clean data streams cleaned by the traffic cleaning apparatus back to corresponding virtual machines. Therefore, the virtual machines may receive clean data streams, and may respond and process normally.

It may be seen from the above that, in this embodiment, a protection node is deployed in the cloud system. The protection node in the cloud system monitors the data traffic input into the virtual machines; extracts the data streams to be input into the virtual machines if it is detected that the data traffic input into the virtual machines is abnormal, and sends the extracted data streams to the traffic cleaning apparatus for cleaning; and inputs the clean data streams cleaned by the traffic cleaning apparatus back to the virtual machines. Because DDoS protection is performed by using the protection node in the cloud system, not only the DDoS attacks launched by external networks onto the virtual machines in the cloud system are prevented, but also the DDoS attacks between the virtual machines in the cloud system are prevented effectively, and thus the security and the reliability of the cloud system are enhanced comprehensively.

Embodiment 2

To facilitate better understanding of the technical solution of the present disclosure, the following gives more details, by taking an example of a process that a virtual machine management node in a cloud system protects a virtual machine Ai in the cloud system against DDoS attacks.

As shown in FIG. 4, the process may include:

Step 401: The virtual machine management node in the cloud system monitors data traffic input into the virtual machine Ai.

In an application scenario, the virtual machine management node in the cloud system may manage one or more virtual machines (including the virtual machine Ai) located on the same physical host or different physical hosts in the cloud system.

The data streams communicated between the external network and each virtual machine in the cloud system, and the data streams communicated between the virtual machines in the cloud system, pass through the virtual machine management node in the cloud system. The virtual machine management node in the cloud system monitors the data streams input into the virtual machines. The data traffic input into a virtual machine may come from an external network, or come from other virtual machines in the cloud system.

As shown in FIG. 1-a, if Domain 0 is considered as a virtual machine management node in the cloud system, Domain U is a virtual machine managed by Domain 0.

In practical application, the virtual machine management node in the cloud system may, for example, collect statistics on the data traffic input into the virtual machine Ai within a preset duration (such as 30 seconds, 1 minute, or another value). If the virtual machine Ai has an Internet Protocol (IP) address, or a Media Access Control (MAC) address or another outbound address, the virtual machine management node in the cloud system may generate a monitoring table based on the destination address of the data traffic to monitor the data traffic input into the virtual machine Ai, and may use the monitoring table to record statistic information.

Step 402: If the virtual machine management node in the cloud system detects that the data traffic input into the virtual machine Ai is abnormal, then the management node sends, to the traffic cleaning apparatus, a traffic cleaning request indicating a request for cleaning the traffic.

Specifically, if the statistics collected by the virtual machine management node in the cloud system show that the data traffic input into the virtual machine Ai within a preset duration exceeds a preset threshold (such as 50 MB, 100 MB, or another value), then the management node determines that the data traffic input into the virtual machine Ai is abnormal, and starts a traffic cleaning mechanism. The traffic cleaning request may further carry an identifier of the virtual machine Ai, and accordingly, the traffic cleaning apparatus may learn that the data traffic input into the virtual machine Ai is abnormal.

Step 403: The traffic cleaning apparatus sends a traffic cleaning response to the virtual machine management node in the cloud system.

In practical application, the traffic cleaning apparatus may detect whether sufficient cleaning resources exist currently (the cleaning resources may refer to idle processing capabilities), and, if sufficient cleaning resources exist currently, send, to the virtual machine management node in the cloud system, a traffic cleaning response indicating permission of cleaning traffic (the traffic cleaning response may still carry the identifier of the virtual machine Ai).

Nevertheless, when detecting that there are not sufficient resources currently, the traffic cleaning apparatus may send, to the virtual machine management node in the cloud system, a traffic cleaning response indicating no permission of cleaning traffic currently (the traffic cleaning response may still carry the identifier of the virtual machine Ai), and therefore, the virtual machine management node in the cloud system may wait for a specific period (such as 2 seconds, 5 seconds, or another value), and then send, to the traffic cleaning apparatus, a traffic cleaning request indicating a request for cleaning traffic. This process repeats itself until the traffic cleaning apparatus finishes cleaning the traffic. Particularly, if multiple traffic cleaning apparatuses are available for selecting, then if the traffic cleaning apparatus currently requested to clean the traffic lacks sufficient cleaning resources for the moment, the virtual machine management node in the cloud system may request another traffic cleaning apparatus to clean the traffic.

Here, a scenario is taken as an example that the traffic cleaning apparatus currently has sufficient cleaning resources for cleaning traffic for the virtual machine Ai.

Step 404: The virtual machine management node in the cloud system receives a traffic cleaning response indicating permission of cleaning traffic from the traffic cleaning apparatus, extracts the data streams to be input into the virtual machine Ai, and sends the extracted data streams to the traffic cleaning apparatus for cleaning the traffic.

In practical application, abnormal data traffic may be caused by UDP flood, SYN flood, ICMP Flood, or another DDoS attack. The initiator of the DDoS attack may be an external network or another virtual machine in the cloud system.

The traffic cleaning apparatus may be an independently-deployed traffic cleaning board, or another deployed structure. The traffic cleaning apparatus may clean the abnormal traffic of the virtual machine Ai to remove suspicious traffic by using one or more of the following technologies: SYN bounce, TCP proxy, UDP flow limiting, null connection detection, DNS TC bounce and other technologies.

For example, if the traffic cleaning apparatus cleans the traffic based on an SYN bounce mechanism, when receiving an SYN packet from a client to a destination server, the traffic cleaning apparatus may fake itself as a destination server to communicate with the client, and responds with a specially-constructed SYN-ACK packet that has an acknowledgment serial number. If the client source IP in the SYN packet is real, the client receives a special SYN-ACK packet sent by the traffic cleaning apparatus, and at the same time constructs an RST packet that has the same serial number as an original acknowledgment serial number. The traffic cleaning apparatus makes a judgment according to the information in the packet. If the serial number is the same as the serial number of an initially created SYN-ACK packet, the traffic cleaning apparatus considers the IP as real, and adds the IP into a whitelist. Afterward, the client re-sends the SYN packet automatically, and the traffic cleaning apparatus receives the packet and may forward the packet directly if the traffic cleaning apparatus finds the whitelist.

If the traffic cleaning apparatus cleans the traffic based on a TCP (Transmission Control Protocol) proxy mechanism, when a SYN packet from a client arrives at the traffic cleaning apparatus, an SYN proxy does not forward the SYN packet, but returns an SYN-ACK packet to the client proactively in the name of a server. If an ACK packet is received from the client, it indicates that the access is normal, and the traffic cleaning apparatus sends an SYN packet to the server and completes three-way handshaking, and then communicates with the server and the client on behalf of the client and the server respectively to complete the forwarding.

If the traffic cleaning apparatus cleans the traffic based on a UDP current limiting mechanism, when the traffic exceeds a threshold, the traffic cleaning apparatus limits the traffic for the purpose of protection.

If the traffic cleaning apparatus cleans the traffic based on null connection detection, the traffic cleaning apparatus may periodically collect statistics on the number of TCP connections of an IP which is protected, and, once a statistic value exceeds a threshold, determines that a null connection attack occurs, and restricts a source IP from which too many TCP connections are initiated.

If the traffic cleaning apparatus cleans the traffic based on a DNS TC bounce mechanism, the traffic cleaning apparatus may solve the security protection issue of the DNS security by converting a UDP communication manner of the DNS into a TCP communication manner, thereby enhancing a DNS security protection capability massively. The DNS has a feature: when the client sends a request, if a DNS server is ready for making a response but discovers that the data amount is too large, which is larger than 512 bytes, the DNS server sets the TC flag in the Flag field of the DNS packet header to 1, and then returns 512 truncated bytes of data to the client. After receiving the packet, the domain name resolver of the client reads a TC field first, and learns that the packet is truncated, and therefore, uses a TCP connection manner to connect the TCP port of the DNS (Domain Name System) proactively, and sends the request again to exchange information.

Understandably, the traffic cleaning mechanisms used by the traffic cleaning apparatus are not limited to the traffic cleaning mechanisms described above. The traffic cleaning apparatus may use other traffic cleaning manners to clean traffic as needed.

Step 405: The traffic cleaning apparatus sends the cleaned data traffic to the virtual machine management node in the cloud system.

Step 406: The virtual machine management node in the cloud system receives the cleaned data streams from the traffic cleaning apparatus, and inputs the cleaned data traffic into the virtual machine Ai.

Understandably, the virtual machine management node in the cloud system inputs the data streams cleaned by the traffic cleaning apparatus back to the virtual machine Ai. Therefore, the virtual machine Ai may receive cleaned data streams, and may also respond and process normally, thereby preventing an external network or other virtual machines in the cloud system from launching DDoS attacks onto the virtual machine Ai.

Therefore, in this embodiment, the virtual machine management node in the cloud system monitors the data traffic input into the virtual machines; extracts the data streams to be input into a virtual machine if it is detected that the data traffic input into the virtual machine is abnormal, and sends the extracted data streams to the traffic cleaning apparatus for cleaning; and inputs the data streams cleaned by the traffic cleaning apparatus back to the virtual machine. Because DDoS protection is performed by using the protection node in the cloud system, not only the DDoS attacks launched by external networks onto the virtual machines in the cloud system are prevented, but also the DDoS attacks between the virtual machines in the cloud system are prevented effectively, and thus the security and the reliability of the cloud system are enhanced comprehensively.

To better implement the above technical solution of the present disclosure, the following describes an apparatus and a system for implementing the above technical solution.

Embodiment 3

As shown in FIG. 5-a, this embodiment provides a protection node 500 in a cloud system, where the cloud system includes the protection node 500 and multiple virtual machines, data streams communicated between the virtual machines pass through the protection node. The protection node 500 in the cloud system may specifically include: a monitoring module 510, an extracting and sending module 520, a receiving module 530, and an inputting module 540.

The monitoring module 510 is configured to monitor data traffic input into virtual machines.

In an application scenario, the protection node 500 in the cloud system may be a virtual machine management node in the cloud system (i.e., the virtual machine management node in the cloud system manages one or more virtual machines located in the same physical host or different physical hosts in the cloud system), or may be an apparatus deployed between the virtual machine management node and each virtual machine in the cloud system. The data streams communicated between the external network and each virtual machine in the cloud system, and the data streams communicated between the virtual machines in the cloud system, pass through the protection node 500 in the cloud system. The protection node 500 in the cloud system monitors the data streams input into the virtual machines. The data streams input into a virtual machine may come from an external network, or come from other virtual machines in the cloud system.

The monitoring module 510 is specifically configured to collect statistics on the data traffic input into the virtual machine within a preset duration (such as 30 seconds, 1 minute, or another value); if the statistics show that the data traffic input into the virtual machine within the preset duration exceeds a preset threshold (such as 50 MB, 100 MB, or another value), determine that the data traffic input into the virtual machine is abnormal.

The extracting and sending module 520 is configured to extract data streams to be input into the virtual machines if the monitoring module 510 detects that the data traffic input into the virtual machines is abnormal, and send the extracted data streams to a traffic cleaning apparatus for cleaning.

The receiving module 530 is configured to receive the data streams cleaned by the traffic cleaning apparatus.

The inputting module 540 is configured to input the cleaned data streams that are received by the receiving module 530 into the virtual machines.

As shown in FIG. 5-b, in an application scenario, the protection node 500 in the cloud system may further include:

a requesting module 550, configured to: before the extracting and sending module 520 extracts the data streams to be input into the virtual machines, send, to the traffic cleaning apparatus, a traffic cleaning request indicating a request for cleaning the traffic.

a responding module 560, configured to receive a traffic cleaning response from the traffic cleaning apparatus, where the traffic cleaning response indicates permission of cleaning the traffic. It should be noted that the protection node 500 in the cloud system in this embodiment may be the virtual machine management node in the cloud system in the preceding embodiment, and may serve to collaborate in implementing all technical solutions in the method embodiments described above. The functions of the function modules of the protection node may be implemented according to the methods described in the method embodiments above. For the detailed implementation process, a reference may be made to the relevant descriptions in the above embodiments.

It may be seen from the above that, in this embodiment, the protection node is deployed in the cloud system. The protection node 500 in the cloud system monitors the data traffic input into the virtual machines; extracts the data streams to be input into the virtual machine if it is detected that the data traffic input into the virtual machines is abnormal, and sends the extracted data streams to the traffic cleaning apparatus for cleaning; and inputs the data streams cleaned by the traffic cleaning apparatus back to the virtual machines. Because DDoS protection is performed by using the protection node in the cloud system, not only the DDOS attacks launched by external networks onto the virtual machines in the cloud system are prevented, but also the DDoS attacks between the virtual machines in the cloud system are prevented effectively, and thus the security and the reliability of the cloud system are enhanced comprehensively.

Embodiment 4

FIG. 6 is a schematic diagram of a protection system in a cloud system according to an embodiment of the present disclosure. The cloud system includes a protection node and multiple virtual machines, data streams communicated between the virtual machines pass through the protection node, and the protection system may include a protection node 610 in the cloud system and a traffic cleaning apparatus 620.

The protection node 610 in the cloud system is configured to monitor data traffic input into virtual machines; extract data streams to be input into the virtual machines if it is detected that the data traffic input into the virtual machines is abnormal, and send the extracted data streams to a traffic cleaning apparatus 620 for cleaning; receive the data streams cleaned by the traffic cleaning apparatus 620; and input the data streams cleaned by the traffic cleaning apparatus 620 into the virtual machine.

The traffic cleaning apparatus 620 is configured to clean the data streams that are from the protection node 610 in the cloud system and to be input into the virtual machines, and send the cleaned data streams to the protection node 610 in the cloud system.

In an application scenario, the protection node 610 in the cloud system may be a virtual machine management node in the cloud system (the virtual machine management node in the cloud system manages one or more virtual machines located in the same physical host or different physical hosts in the cloud system), or may be an apparatus deployed between the virtual machine management node and each virtual machine in the cloud system. The data streams communicated between the external network and each virtual machine in the cloud system, and the data streams communicated between the virtual machines in the cloud system, pass through the protection node 610 in the cloud system. The protection node 610 in the cloud system monitors the data streams input into the virtual machines. The data streams input into the virtual machines may come from an external network, or come from other virtual machines in the cloud system.

In practical application, the protection node 610 in the cloud system may, for example, collect statistics on the data traffic input into the virtual machines within a preset duration (such as 30 seconds, 1 minute, or another value). If the statistics show that the data traffic input into the virtual machines within a preset duration exceeds a preset threshold (such as 50 MB, 100 MB, or another value), it may be determined that the data traffic input into the virtual machines is abnormal.

In an application scenario, when the protection node 610 in the cloud system detects that the data traffic input into the virtual machines is abnormal, the protection node 610 in the cloud system may directly extract the data streams to be input into the virtual machines, and send the extracted data traffic to the traffic cleaning apparatus 620 for cleaning directly. Alternatively, when the protection node 610 in the cloud system detects that the data traffic input into the virtual machines is abnormal, the protection node may first send, to the traffic cleaning apparatus 620, a traffic cleaning request indicating a request for cleaning the traffic; after a traffic cleaning response indicating permission of traffic cleaning is received from the traffic cleaning apparatus 620 (indicating that the traffic cleaning apparatus 620 has sufficient cleaning resources), the protection node extracts the data streams to be input into the virtual machines, and sends the extracted data streams to the traffic cleaning apparatus 620 for cleaning. In addition, if a traffic cleaning response, which indicates no permission of traffic cleaning, is received from the traffic cleaning apparatus 620 (indicating that the traffic cleaning apparatus 620 may lack sufficient cleaning resources currently), the protection node 610 in the cloud system may wait for a specific period (such as 2 seconds, 5 seconds, or another value), and then send, to the traffic cleaning apparatus 620, a traffic cleaning request indicating a request for cleaning the traffic. This process repeats itself until the traffic cleaning apparatus 620 finishes cleaning the traffic.

Particularly, if multiple traffic cleaning apparatuses are available for selecting, then if the traffic cleaning apparatus 620 currently requested to clean the traffic lacks sufficient cleaning resources for the moment, the protection node 610 in the cloud system may request another traffic cleaning apparatus to clean the traffic.

In practical application, abnormal data traffic may be caused by UDP flood, SYN flood, ICMP Flood, or another DDoS attack. The initiator of the DDoS attack may be an external network or another virtual machine in the cloud system.

The traffic cleaning apparatus 620 may be an independently-deployed traffic cleaning board, or another deployed structure. The traffic cleaning apparatus 620 may clean traffic by using one or more of the following technologies: SYN bounce, TCP proxy, UDP flow limiting, null connection detection, DNS TC bounce and/or one or more other technologies.

It should be noted that, for brevity, the above method embodiments are described as a series of actions. But those skilled in the art should understand that the present disclosure is not limited to the order of the described actions, because according to the present disclosure, some steps may adopt other order or occur simultaneously. It should be further understood by persons skilled in the art that the described embodiments all belong to exemplary embodiments, and the involved actions and modules are not necessarily needed by the present disclosure.

In the above embodiments, the description of each embodiment has its emphasis, and for some embodiments that may not be detailed, reference may be made to the relevant description of other embodiments.

Overall, in the embodiments of the present disclosure, a protection node is deployed in the cloud system. The protection node in the cloud system monitors the data traffic input into the virtual machines; extracts the data streams to be input into the virtual machines if it is detected that the data traffic input into the virtual machines is abnormal, and sends the extracted data streams to the traffic cleaning apparatus for cleaning; and inputs the data streams cleaned by the traffic cleaning apparatus back to the virtual machines. Because DDoS protection is performed by the protection node in the cloud system, not only are DDoS attacks launched by external networks onto the virtual machines in the cloud system prevented, but also DDoS attacks between the virtual machines in the cloud system are prevented effectively, and thus the security and the reliability of the cloud system is enhanced.

Persons skilled in the art should understand that all or a part of the steps of the methods in the embodiments may be implemented by a program instructing relevant hardware. The program may be stored in a computer-readable storage medium, such as a read-only memory, a random access memory, a magnetic disk or an optical disk.

The text above expounds a method, an apparatus, and a system for preventing distributed denial of service attacks in a cloud system according to embodiments of the present disclosure. Although the disclosure is described with reference to some exemplary embodiments, the disclosure is not limited to such embodiments. It is apparent that those skilled in the art may make modifications and variations to the disclosure without departing from the spirit and scope of the disclosure. The disclosure is intended to cover the modifications and variations provided that they fall in the protection scope defined by the following claims or their equivalents.

What is claimed is:

1. A method in a cloud computing system, the method comprising:
monitoring, by a protection node in the cloud computing system, data traffic to be inputted into a virtual machine in the cloud computing system;
determining that the data traffic to be inputted into the virtual machine is abnormal;
obtaining the data traffic based on the determining;
sending the obtained data traffic to a traffic cleaning apparatus to clean the data traffic by removing suspicious traffic from the data traffic wherein removing suspicious traffic is performed by using one or more technologies of: Synchronize (SYN) bounce Transmission Control Protocol (TCP) proxy User Datagram Protocol (UDP) flow limiting and null connection detection;
receiving the cleaned data traffic from the traffic cleaning apparatus; and
inputting the cleaned data traffic into the virtual machine.

2. The method according to claim 1, wherein monitoring the data traffic to be inputted into the virtual machine and determining that the data traffic to be inputted into the virtual machine is abnormal comprises:
collecting statistics on the data traffic to be inputted into the virtual machine within a preset duration; and
if the statistics show that the data traffic to be inputted into the virtual machine within the preset duration exceeds a preset threshold, determining that the data traffic to be inputted into the virtual machine is abnormal.

3. A computer program product comprising a non-transitory computer readable storage medium storing one or more programs, the one or more programs comprising instructions, which when executed by a computer, cause the computer to perform a method comprising:
monitoring data traffic to be inputted into a virtual machine in a cloud computing system;
determining that the data traffic to be inputted into the virtual machine is abnormal;
obtaining the data traffic based on the determining;
sending the obtained data traffic to a traffic cleaning apparatus to clean the data traffic by removing suspicious traffic from the data traffic, wherein removing suspicious traffic is performed by using one or more technologies of: Synchronize (SYN) bounce Transmission Control Protocol (TCP) proxy, User Datagram Protocol (UDP) flow limiting, and null connection detection;
receiving the cleaned data traffic from the traffic cleaning apparatus; and
inputting the cleaned data traffic into the virtual machine.

4. The computer program product according to claim 3, wherein monitoring the data traffic to be inputted into the virtual machine and determining that the data traffic to be inputted into the virtual machine is abnormal comprises:
collecting statistics on the data traffic to be inputted into the virtual machine within a preset duration; and
if the statistics show that the data traffic to be inputted into the virtual machine within the preset duration exceeds a preset threshold, determining that the data traffic to be inputted into the virtual machine is abnormal.

* * * * *

UNITED STATES PATENT AND TRADEMARK OFFICE
CERTIFICATE OF CORRECTION

PATENT NO. : 8,886,927 B2  
APPLICATION NO. : 13/740519  
DATED : November 11, 2014  
INVENTOR(S) : Jiang Page 1 of 1

It is certified that error appears in the above-identified patent and that said Letters Patent is hereby corrected as shown below:

On the Title Page, item [73]

Huawei Technologies Co., Ltd., Guangdong (CN)

should read

Huawei Technologies Co., Ltd., Shenzhen (CN)

Signed and Sealed this
Twenty-third Day of June, 2015

Michelle K. Lee
*Director of the United States Patent and Trademark Office*